June 5, 1951 H. L. KELLOGG ET AL 2,555,975

PHASE SHIFTING CIRCUIT

Filed Jan. 20, 1950 2 Sheets-Sheet 1

Inventors:
Harry L. Kellogg,
Robert W. Kuenning,
by Ernest C. Britton
Their Attorney.

June 5, 1951 H. L. KELLOGG ET AL 2,555,975

PHASE SHIFTING CIRCUIT

Filed Jan. 20, 1950 2 Sheets-Sheet 2

Inventors:
Harry L. Kellogg,
Robert W. Kuenning,
by Ernest C. Britton
Their Attorney.

UNITED STATES PATENT OFFICE 2,555,975

PHASE SHIFTING CIRCUIT

Harry L. Kellogg, Scotia, and Robert W. Kuenning, Schenectady, N. Y., assignors to General Electric Company, a corporation of New York Application January 20, 1950, Serial No. 139,682

3 Claims. (Cl. 323—126)

Our invention relates to phase shifting circuits and more particularly to phase shifting circuits utilizing magnetic amplification means for controlling the degree of phase shift and reactance means for modifying the shape of the alternating current wave together with resistance means for increasing the speed of response of the circuit and for improving the shape of the alternating voltage wave.

In electric discharge devices of the ignitron type wherein a mercury pool cathode and an ignitor for initiating electronic emission at the cathode are used, it is necessary that the electric energy supplied to the ignitor be timed precisely in order that the device can be properly controlled and it is the practice to adjust the phase relation of the ignitor firing circuit by various types of phase shifting circuits. Most known phase shifting circuits are either too slow in response or tend to produce wave shapes which are greatly distorted from the desired sinusoidal wave shape, or require excessive control power.

An object of our invention is to provide an improved phase shifting circuit wherein the current and voltage waves are not appreciably distorted.

Another object of our invention is the provision of an improved phase shifting circuit wherein effective and prompt response are possible.

Still another object of our invention is to provide an improved phase shifting circuit utilizing magnetic amplification means for controlling the degree of phase shift and wherein means are provided for modifying the wave shapes produced thereby so that such waves are substantially sinusoidal.

The invention utilizes a magnetic amplifier having a pair of conducting coils arranged in parallel together with a unidirectional conducting device arranged in series with each of these coils to supply each half cycle of current to a load circuit from an alternating current supply circuit. A control winding energized with direct current is used to effect variations in the degree of saturation of the amplifier. In accordance with the present invention, resistance means is arranged in series with each of the coils of the amplifier to increase the speed of response of the circuit and to improve the shape of the voltage output wave and reactance means is arranged in parallel with the amplifier coils to improve the shape of the current output wave.

Figure 1:
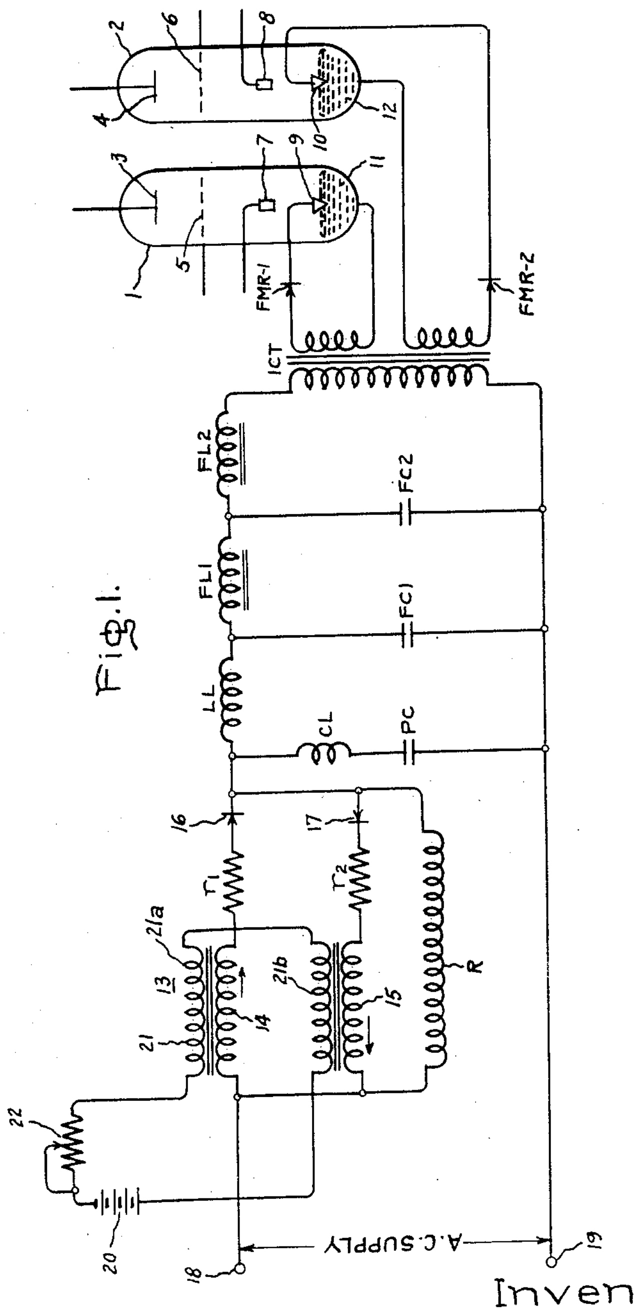
Figure 2:
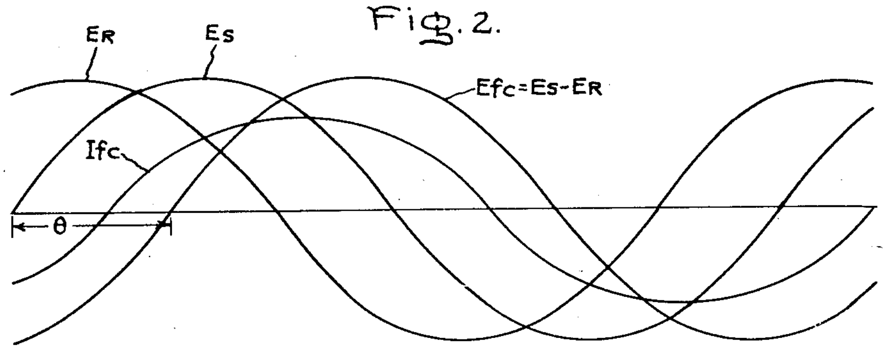
Figures 3, 4:
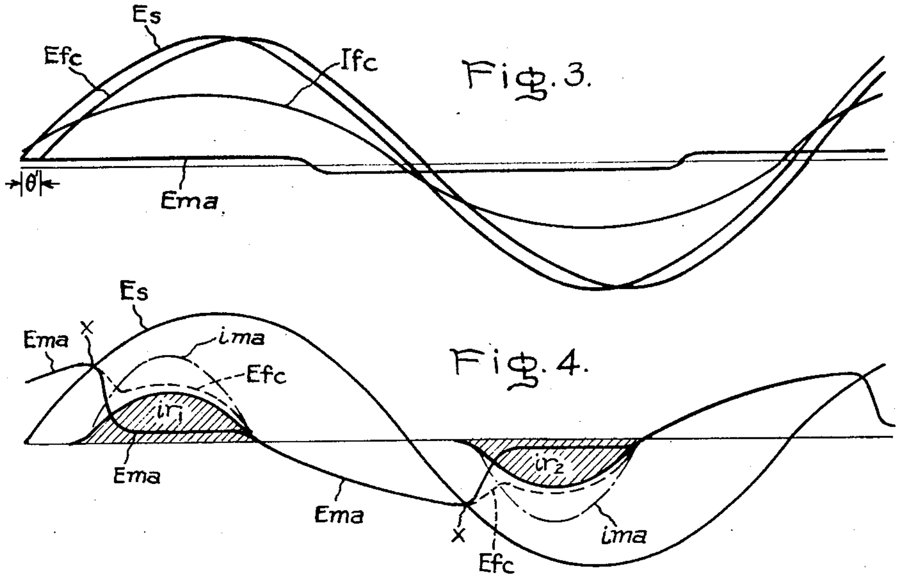
Figure 5:
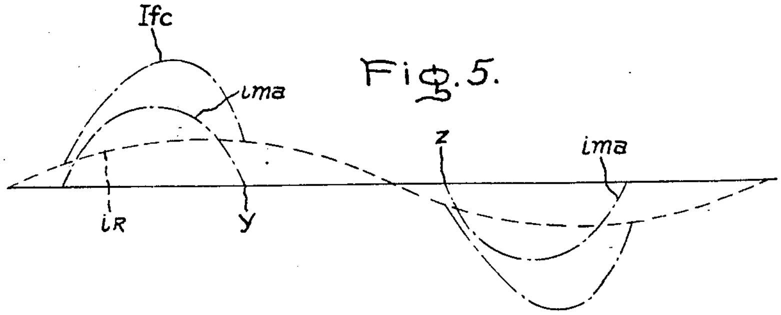

For a better understanding of our invention reference may be had to the accompanying drawings in which Fig. 1 is a schematic representation of our invention as embodied in a firing circuit for ignitor elements used to initiate a cathode spot in an electric discharge device of the ignitron type; Fig. 2 is a family of curves showing the phase relationship between certain voltages and currents together with the wave shape thereof when the magnetic amplifier is adjusted so that its impedance is high in magnitude; Fig. 3 is a family of curves similar to Fig. 2 and represents the condition when the impedance of the magnetic amplifier is adjusted to a low magnitude; Figs. 4 and 5 are similar to Figs. 2 and 3 and represent conditions obtaining when the impedance of the amplifier is adjusted to an intermediate valve.

Fig. 1 shows our invention as applied to the ignitor firing circuit of a pair of ignitron tubes 1 and 2. Ignitrons 1 and 2 are respectively provided with plate elements 3 and 4, control grids 5 and 6, holding anodes 7 and 8, ignitors 9 and 10 which are respectively immersed in mercury pools 11 and 12 which respectively form the cathodes of tubes 1 and 2. Ignitor 9 is energized through unidirectional conducting device FMR—1 from a secondary winding of ignitor coupling transformer ICT. Ignitor 10 of tube 2 is energized through unidirectional conducting device FMR—2 from a secondary winding of transformer ICT. The primary winding of transforemr ICT is energized from a phase shifting network generally indicated by the numeral 13 through the circuit comprising linear reactor LL, saturable reactors FL1 and FL2 and the capacitor elements FC1 and FC2.

As is disclosed and claimed in United States Patent 2,523,027 granted upon an application of B. D. Bedford and H. L. Kellogg and assigned to the assignee of this invention the saturable reactors FL1 and FL2 are arranged so that the voltage rating of reactor FL1 is substantially greater than that of reactor FL2. Also the impedance of saturable reactor FL1 when saturated is substantially greater than the impedance of reactor FL2 when saturated. Thus a charge from the alternating current supply is supplied to capacitor FC1 through the phase shift network 13 and subsequently this charge on capacitor FC1 is discharged into capacitor FC2 through reactor FL1. Likewise, the charge accumulated on capacitor FC2 is subsequently discharged to the primary winding of transformer ICT through reactor FL2. Since the impedance of reactor FL2 is considerably less when that reactor is saturated than is the impedance of reactor FL1 when saturated, the flow of current from capacitor FC2 to the primary winding of transformer ICT is much greater than the current flow from capacitor FC1 through reactor FL1 and into capacitor FC2. In this way, a concentrated energy flow of relatively large power is supplied to ignitor 9 without appreciably impairing the voltage supplied to the ignitor and the component parts of the ignitor firing circuit can be constructed of much smaller physical size than in previous ignitor firing circuits.

The phase shifting arrangement 13 comprising our invention is provided with a winding 14 in parallel with a winding 15. A resistor $r_1$ and a unidirectional conducting device 16 are arranged in series with respect to winding 14 and a resistor $r_2$ as well as unidirectional conducting device 17 are arranged in series with the winding 15. Thus, it will be obvious that whatever the polarity of the alternating current supplied to the terminals 18 and 19 may be at any instant, current will be caused to flow through the winding 14 in the direction of the arrow during half cycles when terminal 18 is positive but not when that terminal is negative due to the action of unidirectional conducting device 16. When terminal 18 is negative, current will flow through winding 15 in the direction indicated by the arrow but, due to the action of unidirectional conducting device 17, current will not flow through winding 15 when terminal 18 is positive.

For the purpose of adjusting the degree of saturation of the windings 14 and 15, a source of direct current 20 is used to supply to control winding 21, a direct current bias which is adjustable by means of the device 22. Since the winding 21 conducts direct current and since the flux established by the windings 14 and 15 is always in the same direction, the portion 21*a* of winding 21 and the portion 21*b* of winding 21 may be wound in such a direction that the bias from source 20 will either oppose or augment the flux of both windings 14 and 15 due to the flow of current therethrough from the alternating current source terminals 18 and 19. The polarity of source 20 can be reversed if desired by known potentiometer means.

Those portions of the network 13 described thus far can be adjusted so that the impedance of each of the windings 14 and 15 is normally of a very high or very low value by suitable adjustment in the device 22. For example, a bias could be applied to windings 14 and 15 which would cause these windings to afford a very high or a very low impedance to the flow of current therethrough. By the same token an intermediate bias may be chosen so that a current of intermediate proportions in control winding 21 will cause saturation of the windings 14 and 15 only when aided by the voltage applied to coils 14 and 15 from source 18—19 to effect a substantial reduction in the impedance of these windings during only a portion of each cycle.

The reactor CL and capacitor PC of Fig. 1 are for the purpose of obtaining the desired power factor and also act to improve the wave shape in accordance with known principles.

Fig. 2 is representative of certain voltage and current relationships existing when the windings 14 and 15 are adjusted to afford a very high value of impedance such that the voltage available is insufficient to cause saturation of coils 14 and 15. In Fig. 2 the supply voltage at terminals 18 and 19 of Fig. 1 is represented by the curve $E_s$. The voltage represented by the curve $E_{fc}$ is the voltage applied between terminal 19 and the source terminal of linear reactor LL and the angle Θ represents the phase shift accomplished by the network 13. The current supplied by the voltage $E_{fc}$ to the firing circuit is represented by the curve $I_{fc}$ and is shown lagging the voltage $E_{fc}$ by a small angle. The voltage which appears across the reactance R, shown in Fig. 1 is represented by the curve in Fig. 2 designated $E_R$.

The phase shift angle may be reduced by adjusting device 22 so as to increase the saturation of windings 14 and 15 by the action of current flowing through control winding 21. In this way, the impedance of windings 14 and 15 can be reduced to a relatively low value due to saturation and under such conditions, the various relationships may be represented by the curves shown in Fig. 3. It will be observed that the phase shift angle Θ′ is relatively small under these conditions. From Figs. 2 and 3, it will be observed that the shape of the voltage waves $E_{fc}$ and of the current waves $I_{fc}$ are substantially sinusoidal and hence are suitable for energizing an ignitor firing circuit.

If the current supplied to winding 21 is adjusted to some intermediate value, the voltage and current waves of the quantities $E_{fc}$ and $I_{fc}$ are considerably distorted due to the occurrence of the saturated condition at some point on the voltage $E_s$ intermediate its maximum and zero values so as to render the network 13 unsuitable for use in ignitor firing circuit if the reactor R and the resistors $r_1$ and $r_2$ are omitted. In accordance with our invention, these resistors $r_1$ and $r_2$ and the reactor R are utilized to render the voltage and current waves supplied to the firing circuit through the network 13 substantially sinusoidal for intermediate values of current in control winding 21.

Fig. 4 respresents the improvement in the shope of the voltage wave due to the action of resistors $r_1$ and $r_2$. In Fig. 4, the solid line curve $E_s$ represents the voltage at terminals 18 and 19 as in Figs. 2 and 3. The solid line voltage $E_{ma}$ represents the voltage drop of the magnetic amplifier coils 14 and 15. It will be obvious that at a predetermined point such as point X on the wave $E_s$ the windings of the magnetic amplifier suddenly become saturated and the voltage wave $E_{ma}$ is suddenly reduced by a substantial amount. A wave shape of voltage such as that represented by the curve $E_{ma}$ in Fig. 4 is not suitable for use in conjunction with ignitor firing circuits. In order to prevent this sudden decrease in the voltage $E_{ma}$, a supplementary voltage is supplied which can be represented by the cross-hatched areas designated $ir_1$ and $ir_2$ in Fig. 4. This voltage is the voltage drop respectively through the resistors $r_1$ and $r_2$ which drop produces an essentially sinusoidal wave form for voltage $E_{fc}$ when combined with those portions of the cycle of the voltage $E_{ma}$ which are particularly distorted. In Fig. 4, the curve $i_{ma}$ represents the current of the magnetic amplifier and, of course, one-half cycle of this current would flow through the winding 14 and the other half cycle would flow through the winding 15. Resistors $r_1$ and $r_2$ also act to increase the speed of phase shift upon suddenly changing the current in winding 21 in such a direction as to induce a circulating current in the loop comprising windings 14 and 15, resistors $r_1$ and $r_2$, and rectifiers 16 and 17 in the conducting direction of rectifiers 16 and 17. Resistors $r_1$ and $r_2$ act to reduce the magnitude of this induced circulating current and cause it to die out rapidly so that the current in winding 21 is effective in controlling the saturation of windings 14 and 15. Otherwise the induced circulating current would delay the effect of the change in current in winding 21.

Fig. 5 also shows the current of $i_{ma}$ of Fig. 4 and it will be observed that there is a considerable period of time as represented by the distance $yz$ during which the current is substantially zero. This would result in the flow of a pulsating current to the ignitor firing circuit which current would not be suitable for this purpose. Reactance R is connected in parallel with the windings 14 and 15 for the purpose of smoothing the current wave. In Fig. 5, the current $i_R$ which is the current through reactor R is substantially sinusoidal in shape. Thus, the addition of each half cycle of the current $i_{ma}$ to the current wave $i_R$ results in a current wave $I_{fc}$ which approaches a sinusoidal shape at least to a degree sufficient that the network 13 can be used as an effective phase shift device without undue distortion of the current wave.

Experimental work which has been conducted shows that the impedance of the reactor R should be 1200 ohms and that the resistance of resistors $r_1$ and $r_2$ should be 40 ohms for a particular arrangement wherein the impedance of windings 14 and 15 is variable from approximately 100 ohms to approximately 1000 ohms.

While there has been shown and described particular embodiments of the invention, it will be obvious to those skilled in the art that various changes and modifications may be made without departing from the invention in its broader aspects and it is, therefore, intended in the appended claims to cover all such changes and modifications as fall within the true spirit and scope of our invention.

What we claim as new and desire to secure by Letters Patent of the United States is:

1. A phase shifting circuit arranged to energize a load and comprising a source of alternating current, a pair of windings arranged in parallel, resistance means and unidirectional conducting means arranged in series with each of said windings, said windings, resistance means and conducting means being energized from said source and said conducting means being connected to allow alternate half cycles of electric current to flow therethrough, means for regulating the impedance of said windings, and reactance means arranged in parallel with said windings for causing the current output of said circuit to approach a sinusoidal form when said windings are adjusted to a value of impedance such that each of said windings is saturated at a predetermined instantaneous value of the voltage of said source.

2. A phase shifting circuit arranged to energize a load and comprising a pair of windings arranged in parallel, resistance means and unidirectional conducting means arranged in series with each of said windings, said conducting means being connected to allow alternate half cycles of electric current to flow therethrough, means for regulating the impedance of said windings, said resistance means having a value of resistance sufficient to prevent a substantial decrease in the instantaneous value of the voltage across said windings and said resistance means when said windings are adjusted for a value of impedance intermediate the minimum and maximum values thereof, and reactance means arranged in parallel with said windings and the associated resistance and unidirectional conducting means for supplying to the load a current the instantaneous values of which are such that the total instantaneous values of current supplied to the load by said windings and by said reactance means result in a substantially sinusoidal composite current.

3. A phase shifting circuit arranged to energize a load and comprising a pair of windings arranged in parallel, resistance means and unidirectional conducting means arranged in series with each of said windings, said conducting means being connected to allow alternate half cycles of electric current to flow therethrough, current response control means for regulating the impedance of said windings, said resistance means being effective to limit the flow of induced circulating current in the loop including said windings and said conducting means due to a relatively fast change in current controlling said control means, and reactance means arranged in parallel with said windings and the associated resistance and unidirectional conducting means for supplying to the load a current the instantaneous values of which are such that the total instantaneous values of current supplied to the load by said windings and by said reactance means result in a substantially sinusoidal composite current.

HARRY L. KELLOGG.
ROBERT W. KUENNING.

REFERENCES CITED

The following references are of record in the file of this patent:

UNITED STATES PATENTS

| Number | Name | Date |
|---|---|---|
| 2,362,294 | Mittag | Nov. 7, 1944 |